Sept. 20, 1971 W. C. DEE 3,606,500
GAS BEARING ASSEMBLY
Filed Jan. 14, 1969 8 Sheets-Sheet 1

INVENTOR
WILLIAM C. DEE

Sept. 20, 1971　　　　　W. C. DEE　　　　　3,606,500
GAS BEARING ASSEMBLY
Filed Jan. 14, 1969　　　　　　　　　　8 Sheets-Sheet 3
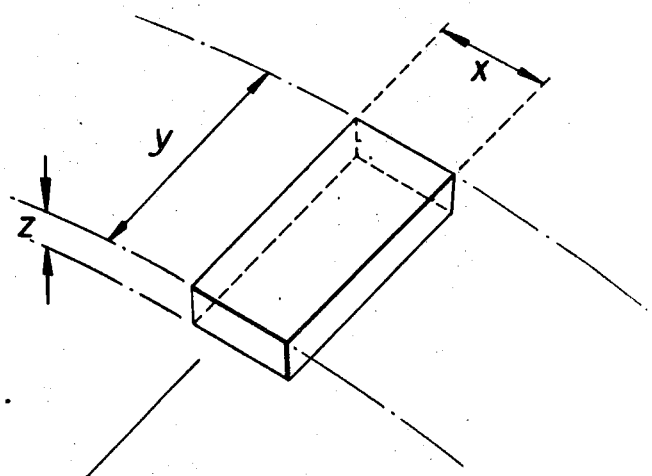
Fig. 7a.
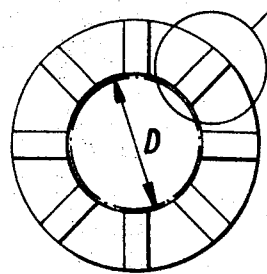
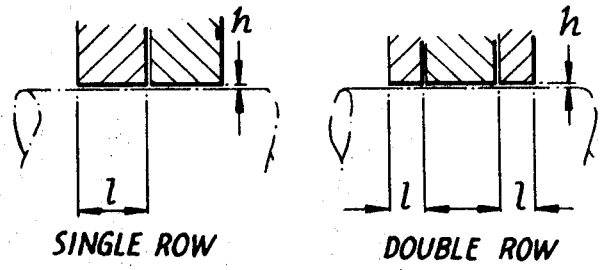
SINGLE ROW　　　　DOUBLE ROW
Fig. 8a.　　　Fig. 8b.　　　Fig. 8c.
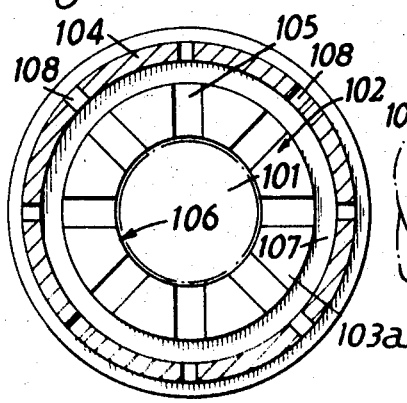
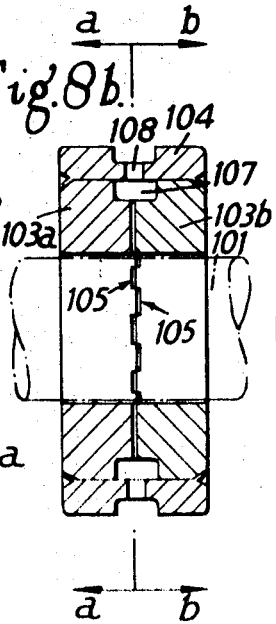
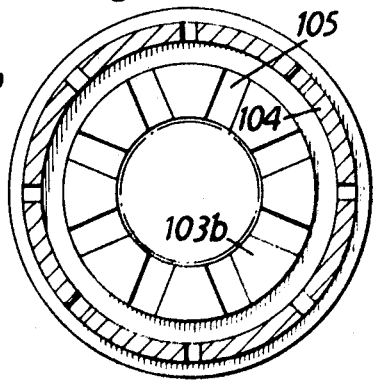
INVENTOR:
WILLIAM C. DEE

INVENTOR:
WILLIAM C. DEE

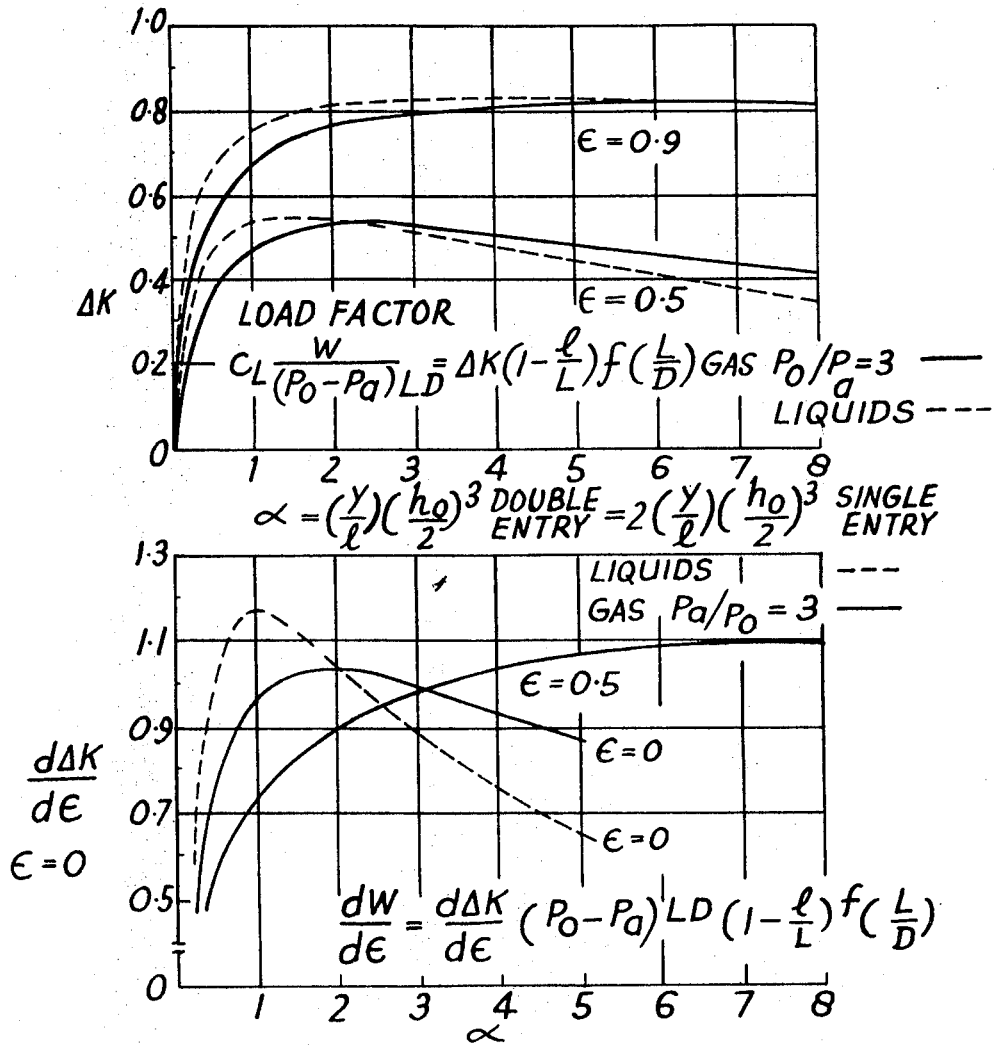
Fig. 18. LOAD FACTOR AND STIFFNESS
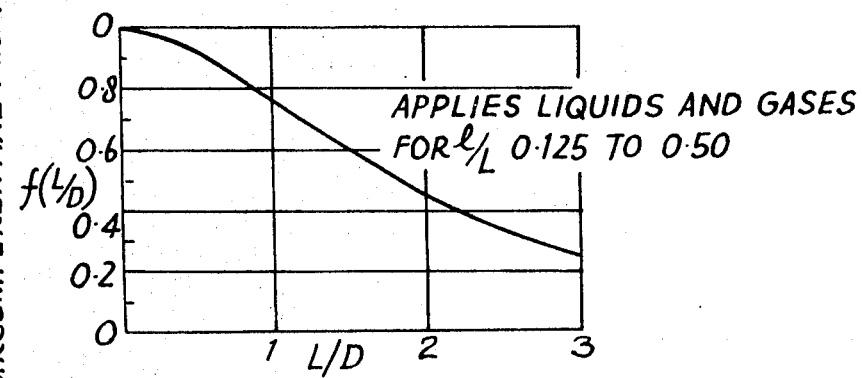
Fig. 19. EFFECT OF L/D RATIO ON LOAD & STIFFNESS 3,606,500
GAS BEARING ASSEMBLY
William C. Dee, "Greenacres" 64, Canford Bottom,
Colehill, Wimborne, Dorset, England
Filed Jan. 14, 1969, Ser. No. 792,220
Claims priority, application Great Britain, Oct. 15, 1968,
48,931/68
Int. Cl. F16c 17/16
U.S. Cl. 308—9          1 Claim

ABSTRACT OF THE DISCLOSURE

A fluid bearing has two or more gas feed slots opening at one or more axial positions into a bearing gap defined between two relatively movable bearing members, the slots being defined between two contiguous elements of one of the bearing members.

---

The invention relates to fluid bearings of the hydrostatic type, where a fluid under pressure is fed to the bearing gap, and concerns the problems associated with manufacturing techniques as well as instabilities encountered in such bearings.

In the present accepted state of the art of gas bearings which utilise orifices to feed the pressurised supporting gas to the bearing gap considerable problems are encountered with the drilling or producing these extremely small diameter jets which can be of the order of five thousandths of an inch or less, and the accuracy with which they are produced. The requirement is that they should be truly radial to the bearing bore and have a clean unbroken edge at both entry and exit. It will be appreciated that this is almost impossible to achieve mechanically.

Coupled with this physical problem also is the fundamental problem of viscosity and density related to small orifices whereby a change of gas, say from air to hydrogen, will vary flow characteristics which entail changing the orifice parameters to accommodate the gas change. Therefore a new bearing must be designed and manufactured to ensure compatibility with each supporting gas to be used.

It is accordingly a first object of the invention to provide an improvement whereby gas feed holes of enhanced flow characteristics compared with those obtained with drilled holes may be provided by techniques other than drilling and which are much more readily applied in practice with adequate or even greater accuracy.

A second object of the invention is to provide an improvement whereby the gas feed holes may be formed in a necessarily truly normal position to the bearing gap by techniques which are readily applied in practice in a relatively simple manner.

A further problem encountered with regard to orifices is that of the dispersion of the gas into the bearing gap, whereby considerable losses are involved with regard to load-carrying capacity and bearing stiffness which can be of the order of 50% or greater.

The accuracy, therefore, to which these orifice design of bearings must be produced, together with their inherent drawbacks, has retarded their more general use in many possible fields of applications.

It has already been shown in the art that some form of continuous line source would obviate certain of these problems but would in turn enhance another problem which is also associated with accepted gas bearing design.

Circumferential flow is a condition which occurs in hydrostatic bearings in two forms. In the static condition when a supporting gas is fed to the bearing gap, pressure distribution within the gap is such as to create a high and low pressure area at nominal positions 180° apart. The high pressure is associated with the load supporting area and results in a circumferential flow from this high pressure area around the bearing to the lower pressure area.

During operation, however, the rotating component of the bearing develops an aerodynamic effect, which increases with speed, whereby the supporting gas within the bearing gap is caused to be dragged around within the bearing gap. This viscous drag effect increases with speed until such time as the rotating member becomes unstable, resulting in a phenomenon referred to as "half speed whirl," which can result in total failure of the bearing due to the rotating component coming into contact with the stationary component of the bearing. Such contact under operating conditions can result in total failure and has been the subject of considerable research work with regard to material compatibility.

It will be seen therefore that by the use of a continuous line source of supply to the bearing, circumferential flow occurring within the bearing gap will also be transmitted to within the continuous line source of supply, and can result in losses of the order of 10% or more with regard to both bearing load carrying capacity and stiffness.

However the advantage of a continuous line source of supply as opposed to the orifice design of bearing is three-fold in that (a) dispersion losses associated with orifices are eliminated, (b) the flow regime is laminar throughout the bearing and compressibility effects, e.g. shock waves, are eliminated, and (c) inlet velocity through the circumferential slot is greatly attenuated when compared with that occurring in an orifice.

A third object of the present invention is accordingly to provide certain improvements relating to (i) the design of the circumferential line source of supply for maximum bearing "stiffness" and load capacity, (ii) the production of a bearing to the physical dimensions of a ball bearing and having comparable characteristics at commercially comparable costs but with reduced frictional levels, (iii) the use of a new material which eliminates problems resulting from possible contact between the inner and outer members of a fluid bearing.

With the reduction of the entry velocity of the gas into the bearing gap by the re-designing of the presently accepted circular orifice construction, research has shown that both viscosity and density factors no longer influence bearing design parameters, whereby a bearing configuration operating on a gas will function equally well on a vapour or a liquid.

A fourth object of the present invention is therefore to provide a bearing construction comparable to that of a ball bearing configuration and capable of operating as a "fluid" bearing in the true sense of the word.

According to a first aspect of the present invention, in a fluid bearing one or more fluid feed holes opening into a bearing gap defined between two relatively movable bearing members are constituted by a slot defined between a face of each of two elements of one of the bearing members.

For a journal fluid bearing, a plurality of holes may each be constituted by a slot defined between a radial face of a first element of the bearing member and an axially-recessed radial face of an abutting second element of that bearing member. In this context "radial" includes the meaning of "possessing a radial component of direction." It is known to be advantageous in a journal bearing if the fluid supply is introduced into the bearing gap at a plurality of angularly and preferably symmetrically spaced positions. Accordingly, in such a fluid bearing the second element may have in its radial face a plurality of axial recesses symmetrically angularly disposed about the axis of rotation of the bearing.

In a preferred arrangement, the axial recessing is formed by milling or grinding across an end face of the second element.

It is in practice relatively simple to machine channels in an exposed surface, and also to provide a truly plane surface to abut against the channelled surface. For example, the channels may readily be milled out, and the plane surface may be lapped.

Although the invention is not limited thereto, the abutting surfaces of the first and second elements would, for convenience, be wholly radial surfaces normal to the bearing gap.

Due to the fact that the channels are formed in an exposed surface of the first element, they can also be very accurately aligned in truly radial positions, so that no extraneous rotational torque is exerted on the other bearing member.

A considerable advantage of the present invention is that the formation of the channels on a axially facing surface permits avoidance of the relatively thin sleeves previously necessitated by drilling of gas feed holes. Accordingly, the outer bearing element can be made of greater radial thickness and thus have proportionately greater mechanical stiffness under stress.

In order to facilitate the obtaining of an even supply of fluid to said holes it is convenient to provide fluid supply passage means therefor including a coaxial annular channel opening axially in the axially-recessed radial face of the second element.

In an axial thrust fluid bearing, a single annular hole may be used to feed fluid to the bearing gap, and such a hole may be constituted by an annular slot defined between an outside diameter of a first element of the bearing member and an inside diameter of a second element of the bearing member. Preferably, such reduction of the outside diameter to provide the radial width of slot desired is carried out by grinding.

According to a second aspect, a single circumferential line source of supply (i.e. circumferential slot means) is divided into a series of short slot lengths, the design parameters being selected in accordance with the formulas set forth in detail below to result in an optimum value of the dimensionless parameter $\alpha$ (see FIGS. 18 and 19 described hereinafter) to give maximum bearing stiffness and load capacity.

In the following formula:

$$\alpha = (h/z)^3 (y/l)(D/nx)$$

$\alpha$ should fall between about 2 and about 8, where $y$ = radial length of slot
$z$ = axial depth of slot
$x$ = circumferential width of slot
$n$ = number of slots in one circumferential group
$D$ = bore diameter of bearing
$h$ = radial bearing clearance
$l$ = distance of slots to the end of the bearing.

For an indication of these dimensions in a typical box-section slot, reference should be made to FIG. 7a of the drawings described below.

In the event however of the slots covering at least 90% of the circumference of the bearing and $nx \approx \pi D$ then $\alpha = (h/z)(y/l)$ and is independent of $x$, width of slot.

It is a design criterion therefore for the slots to be of any ratio of $x$ to $z$.

For a bearing having a single circumferential row of slots therefore $$\alpha = 2(h/z)^3 (y/l)$$

and for a bearing having a double row of circumferential slots $$\alpha = (h/z)^3 (y/l)$$

The requirement that $\alpha$ lie between about 2 and about 8 is indicated in FIG. 18 of the accompanying drawings, where $\alpha$ is shown plotted against $\epsilon$ and $\Delta K$.

In view of slots assuming any ratio of $x$ to $z$ it will be seen that any combination of shape and position of slots may be achieved.

In the slot design of bearing, wherein velocity of fluid flow in the slot is considerably attenuated, the density factor of the supply fluid no longer assumes such importance as is the case with the orifice design of bearing, and consequently a slot type bearing of the characteristics referred to is capable of operating on a range of fluids without design changes. Accordingly gases, vapours or low viscosity liquids can be accommodated, the choice of fluid being dependent upon the operating conditions prevailing. Such a bearing may thus be referred to as a fluid bearing in the full sense of the word "fluid."

In view of the method of construction of the fluid bearing, and the fact that any ratio of $x$ and $z$ can be used in the design parameters, besides variation of the slot design, orifice type bearings may be constructed whereby grooves can be ground across either one or both faces of the mating stationary components of the bearing such that by locking the faces together a series of jets will result.

Orientation of the faces will produce a variable configuration whereby maximum load and stiffness can be obtained.

Where the grooves are located at right angles one to the other, at the four interacting areas, maximum stability will result.

According to another aspect, at least the outer (e.g. a stationary) bearing member is made with at least its gap defining surface formed of silicon nitride.

This ceramic material is capable of operating over a wide temperature range, of the order of $-200°$ C. to $+1000°$ C. and exhibits a frictional level of an extremely low order such that in the event of high surface speed contact between the rotating member and the outer ceramic stationary member no seizure occurs.

The material is capable of being machined with standard machine shop equipment and to extremely fine tolerances when in its prefired state and is extremely stable when final firing is carried out. This stability therefore results in minimum final machining on the finished component, whereby costs are reduced to a minimum.

A further advantage of the use of silicon nitride is obtained under conditions of continuous rubbing, such as occurs in bearings of the self supporting or hydrodynamic type at both start up and slow down. Such rubbing has in the past had to be countered by extremely expensive methods, e.g. flame spray techniques etc., and use of silicon nitride enables costs to be radically reduced.

Further, due to the inert nature of silicon nitride, it can operate under extremely arduous conditions where it is impossible to apply ball bearing technology, and it is capable of sustaining long periods of operation irrespective of possible contacts or continuous rubbing during operation.

In order that the nature of the invention may be readily ascertained, some embodiments of fluid bearing in accordance therewith are hereinafter particularly described by way of non-limiting example with reference to the accompanying drawings, wherein:

FIG. 7a is a diagram to show the location of certain dimensions referred to in this description;

FIGS. 8a, 8b and 8c are views of of a third embodiment of bearing having a single circumferential row of radial slots, FIGS. 8a and 8c being respectively sections taken on the lines a—a and b—b of FIG. 8b;

Figure 15A:
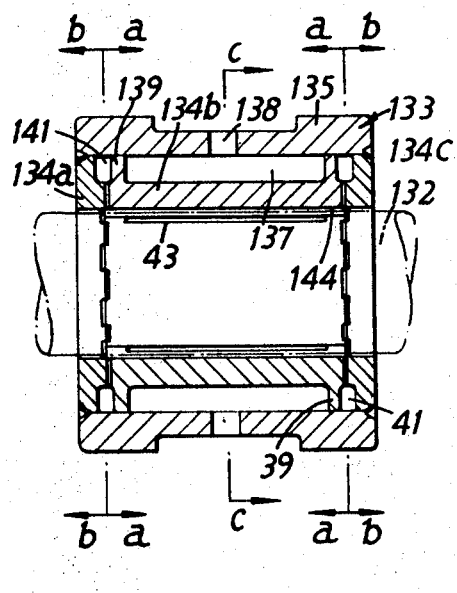
Figure 15B:
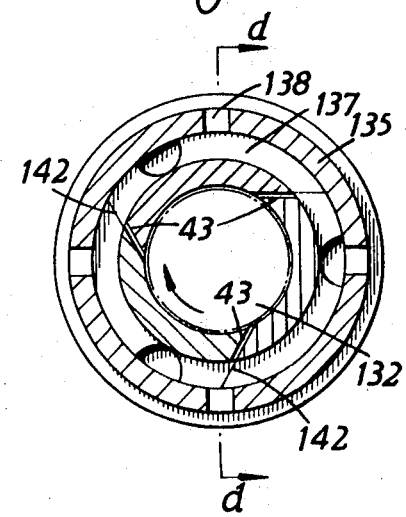
Figure 15C:
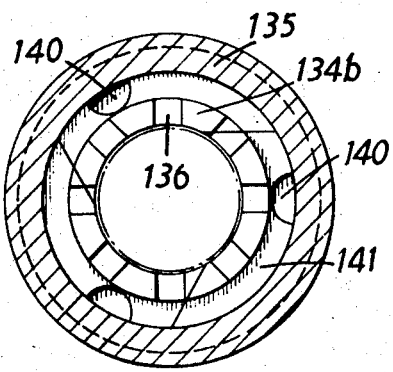
Figure 15D:
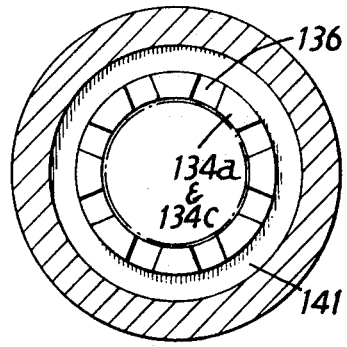
Figure 16A:
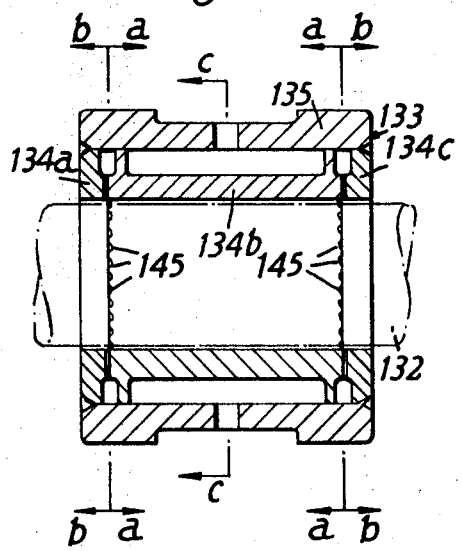
Figure 16B:
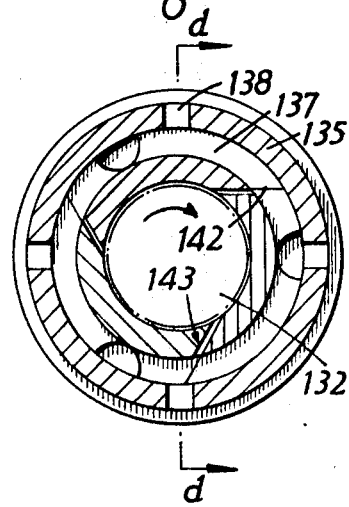
Figure 16C:
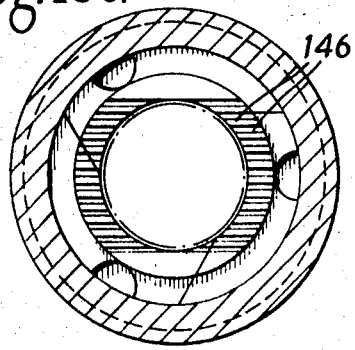
Figure 16D:
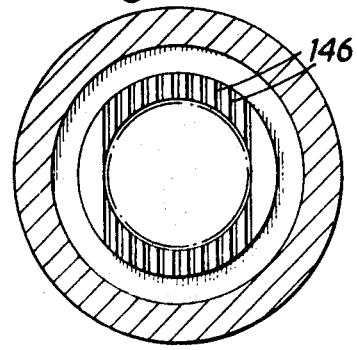
Figure 17A:
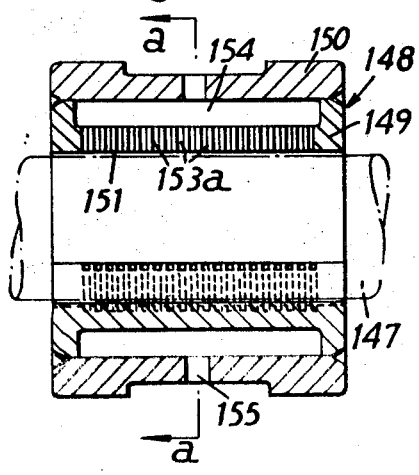
Figure 17B:
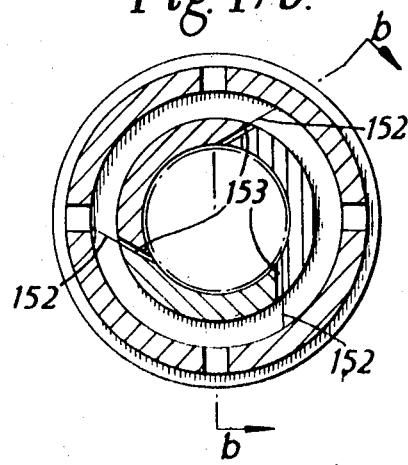

FIGS. 15a, 15b, 15c and 15d are views of of a ninth embodiment of bearing in which there are provided both radial slots (see FIGS. 8a, 8b and 8c, and FIGS. 9a, 9b and 9c) at axially spaced positions along an axis of rotation, and also axial slots which are disposed at a tangent to a circle coaxial with the axis of rotation, FIGS. 15c, 15d and 15b being respectively sections taken on the lines a—a, b—b and c—c of FIG. 15a, and FIG. 15a being a section taken on the line d—d of FIG. 15b;

FIGS. 16a, 16b, 16c and 16d are views of a tenth embodiment of bearing in which there are provided both radial slots (see FIGS. 14a, 14b and 14c) at axially spaced positions along an axis of rotation, and also axial slots which are disposed at a tangent to a circle coaxial with the axis of rotation, FIGS. 16c, 16d and 16b being respectively sections taken on the lines a—a, b—b and c—c of FIG. 16a, and FIG. 16a being a section taken on the line d—d of FIG. 16b;

FIGS. 17a and 17b are views of an eleventh embodiment of bearing in which there are provided axial slots which are disposed at a tangent to a circle coaxial with the axis of rotation, the slots being constituted by a plurality of parallel recesses in one element butted up to a plane face of another element, FIG. 17a being a section taken on the line b—b of FIG. 17b, and FIG. 17b being a section taken on the line a—a of FIG. 17a.

FIG. 18 is two graphs showing the relationship of $\alpha$, $\epsilon$ and $\Delta K$.

FIG. 19 is graph showing the relationship between length-to-diameter ratio and "stiffness" of the bearing.

Figure 1:
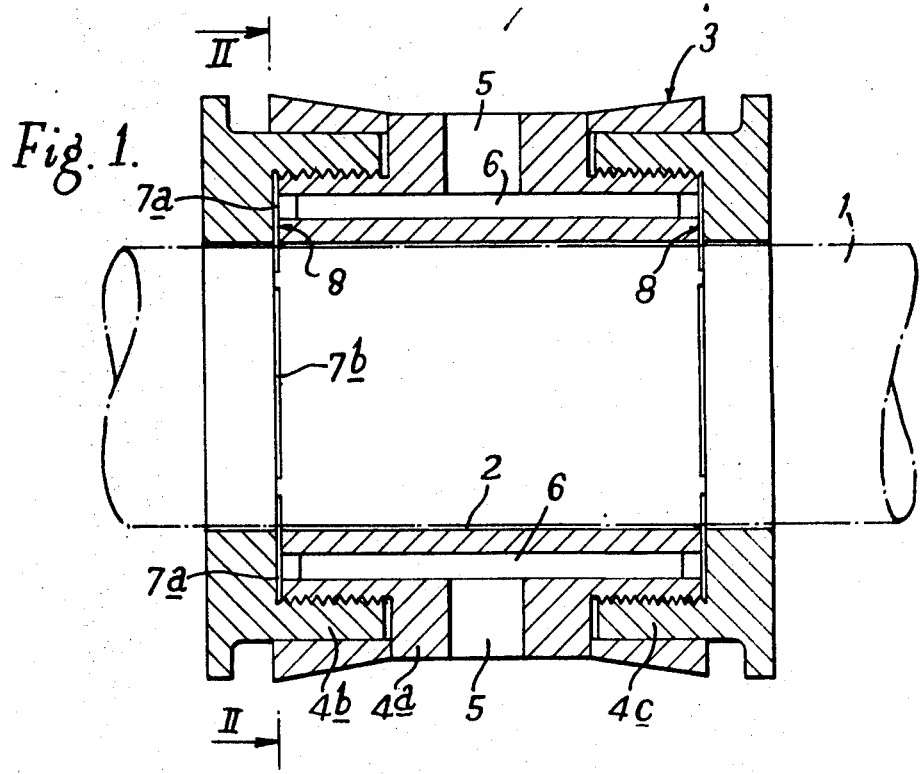
FIG. 1 is an axial section of a first embodiment of journal fluid bearing.
Figure 2:
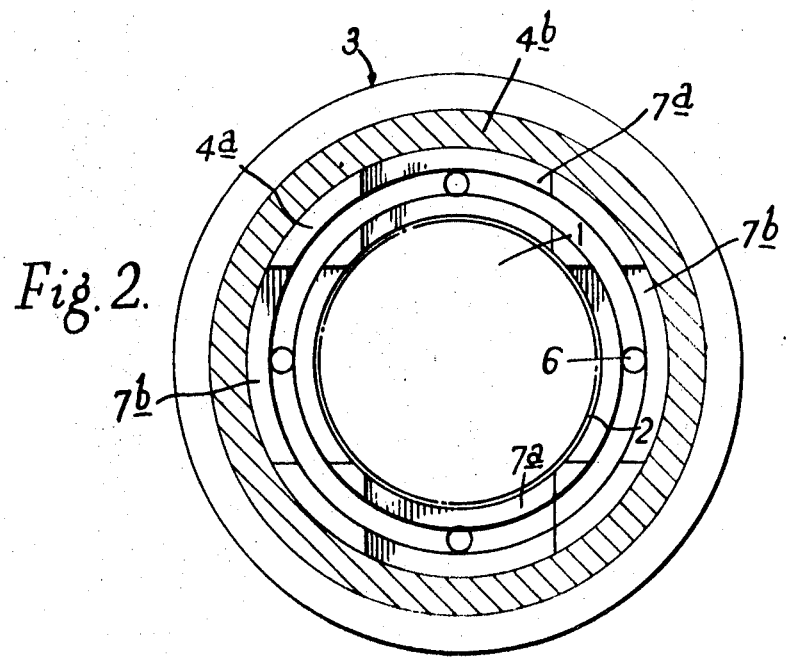
FIG. 2 is a section taken on the line II—II of FIG. 1.

Referring to FIGS. 1 and 2, a journal fluid bearing is constituted by a shaft 1 rotatable with an extremely small clearance 2 within a bearing shell 3 constituted by a sleeve 4a on which are threaded end members 4b and 4c.

The sleeve 4a has radial fluid inlet ports 5 leading to fluid distribution passages 6 drilled parallel to the axis of the bearing.

The two end faces of the sleeve 4a are milled across symmetrically in two directions at 90° so as to produce recesses 7a and 7b. The inside axial end face 8 of each of the end members 4b and 4c is ground and lapped so as to be very accurately radial and when the two end members are threaded into the position shown they serve to define four radial slots disposed at 90° spacing about the axis.

The fluid distribution passages 6 open into these slots and fluid under pressure passes through the slots to the bearing clearance 2.

Figure 3:
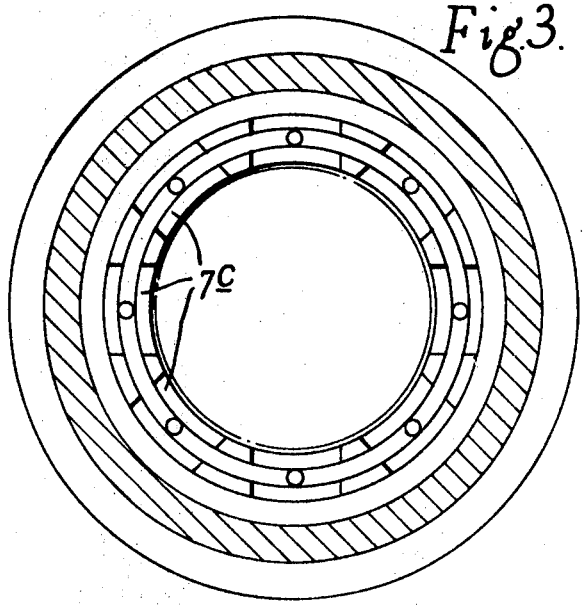
FIG. 3 is a section, similar to that of FIG. 2, of a modified journal fluid bearing.
Figure 7:
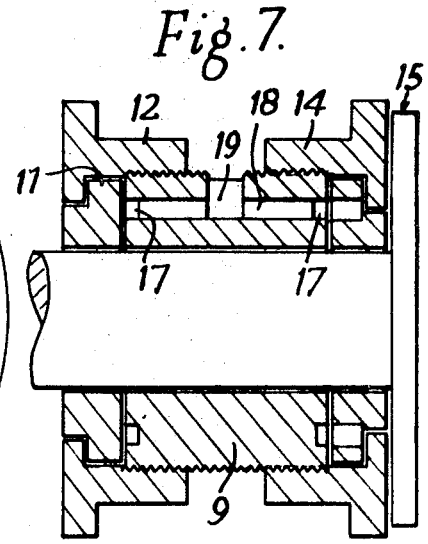
FIG. 7 is an axial section of the assembled bearing of FIG. 4.
Figure 4:
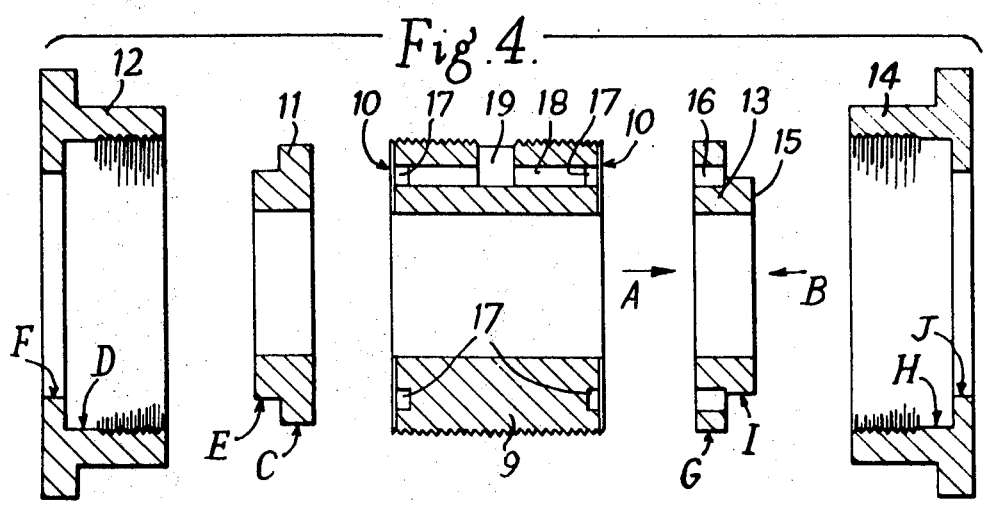
FIG. 4 is an "exploded" axial section of a second embodiment, being an axial thrust bearing.
Figure 5:
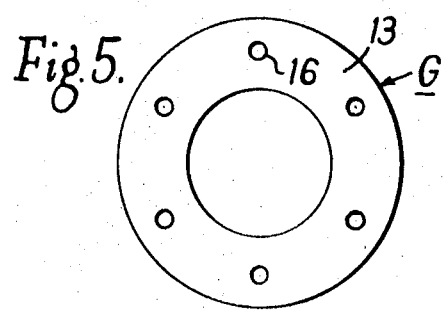
FIG. 5 is a view taken in the direction of the arrow A in FIG. 4.
Figure 6:
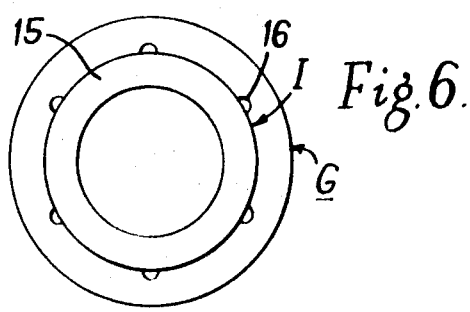
FIG. 6 is a view taken in the direction of the arrow B in FIG. 4.

Referring to FIG. 3, the arrangement is similar to that of FIGS. 1 and 2, but the ends of the sleeve are milled across four times at angles of 45° to provide a total of eight channels 7c symmetrically angularly disposed about the axis of the bearing.

Referring to FIGS. 4 to 7, which shows a bearing including also an axial thrust bearing, the bearing outer member comprises a central sleeve 9 which has radial channels 10 milled across each end face, as described above in relation to FIGS. 1 and 2. Against one end of the sleeve 9 there is seated an end element 11 secured in position by a threaded ring 12. Against the other end of the sleeve 9 there is seated an end element 13 secured in position by a threaded ring 14. On end element 11, the diameter C is ground to be a clearance fit within the diameter D, and diameter E is ground to be an accurate fit into diameter F, thereby ensuring that there is no fluid leakage from the channels 10 other than radially into the bearing gap. On end element 13, diameter G is ground to be an accurate fit into diameter H, but diameter I is ground smaller than diameter J so as to leave an annular slot clearance of say, .001 to .0015 inch. This annular slot supplies, to the thrust bearing gap 15, compressed fluid received through passages 16 communcating with an annular passage 17 supplied through bores 18 from a plurality of radial ports 19.

As an alternative to the screw-threading shown, the rings 12 and 14 could be secured on the sleeve 9 by adhesive.

As an alternative to the bores 18, flats may be milled axially along the outside diameter of the sleeve 9 so as to provide, within the end elements 12 and 14, a series of fluid supply passages parallel to the axis and leading from ports 19 to the radial channels 10.

In FIG. 7a it will be seen that the proposed slot formation is depicted as a box section on which the slot reference parameters are indicated.

Referring to FIGS. 8a, 8b and 8c a fluid bearing comprises an inner bearing member 101, e.g. a cylindrical shaft, and an outer bearing member 102. The outer member 102 is formed by two elements 103a, 103b enclosed within an annulus 104. On the abutting radial end faces of the respective elements 103a, 103b there are formed radial recesses 105. The recesses 105 of the element 103a are angularly offset from the recesses 105 of the element 103b, so that each recess of one element is disposed opposite a land of the other element. There are eight recesses in each element, and each recess forms, together with the abutting radial end face of the other element, a radial slot opening at the inner end to the bearing gap 106 and at the outer end to a feed channel 107 supplied through a plurality of openings 108 with fluid under pressure. Between the elements 103a and 103b there are thus formed a total of sixteen radial slots and, at the inner circumference of the outer bearing member, the combined angular lengths of the sixteen slots preferably constitute the whole of the circumference.

Figure 9A:
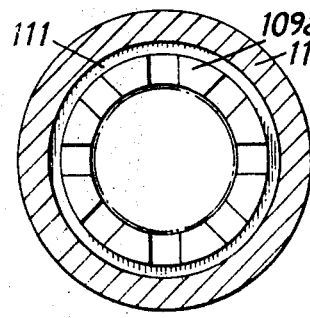
FIGS. 9a, 9b and 9c are views of a fourth embodiment of bearing having two axially-spaced circumferential rows of radial slots, FIGS. 9a and 9c being respectively sections taken on the lines c—c and d—d of FIG. 9b.
Figure 9B:
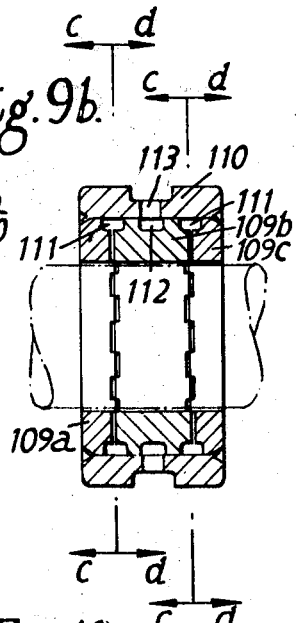
Figure 9C:
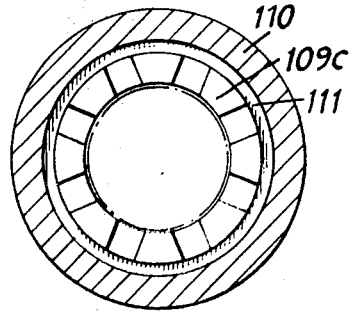

Referring to FIGS. 9a, 9b and 9c, the identical arrangement to that described in relation to FIGS. 8a, 8b and 8c has been applied to a double row bearing in which the outer bearing member is constituted by elements 109a, 109b and 109c enclosed within an annulus 110. Two annular feed channels 111 communicate with a common supply channel 112 fed through openings 113.

Figure 10A:
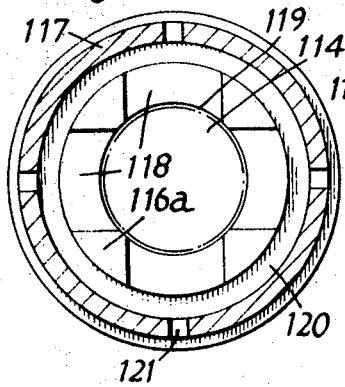
FIGS. 10a, 10b and 10c are views of a fifth embodiment of bearing having a single circumferential row of radial slots, FIGS. 10a and 10c being respectively sections taken on the lines a—a and b—b of FIG. 10b.
Figure 10B:
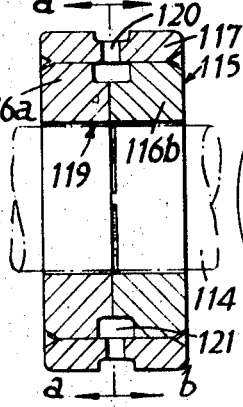
Figure 10C:
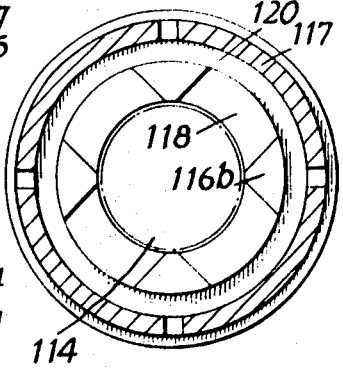

Referring to FIGS. 10a, 10b and 10c, there is shown a bearing having an inner cylindrical member 114 situated within an outer bearing member 115 constituted by elements 116a and 116b enclosed within an annulus 117.

On the inner radial end face of elements 116a there are formed two recesses 118 at right angles. Similarly, element 116b has two recesses 118 at right angles. The elements are mounted with their recesses 118 forming angles of 45°. The recesses 118 each define, with the coinciding land area of the radial end face of the other element, a radial slot opening at its inner end to the bearing gap 119 and at its outer end to a feed passage 120 fed with pressure fluid through openings 121. At the inner circumference of the outer bearing member, the respective recesses 118 of the two elements 116a and 116b overlap angularly, so that a completely circumferential slot is formed, but having portions stepped to one side and the other of the radial meeting plane of the two elements 116a and 116b.

Figure 12:
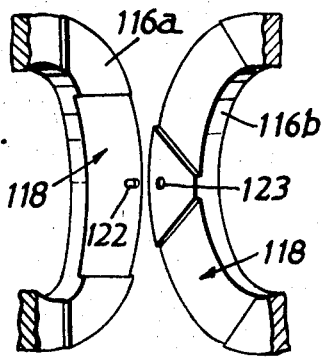
FIG. 12 is a perspective view to show two portions of the bearing of FIGS. 11a, 11b and 11c separated to reveal the manner in which the elements are secured together.

FIG. 12 shows how the two elements 116a and 116b are locked together against relative rotation by means of a peg 122 on one element entering a hole 123 in the other element.

Figure 11A:
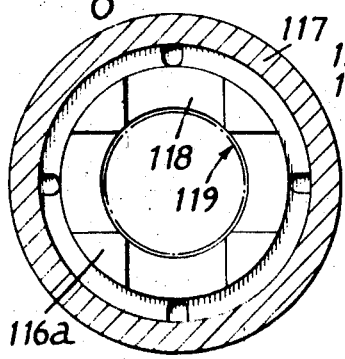
FIGS. 11a, 11b and 11c are views of a sixth embodiment of bearing having two axially-spaced circumferential rows of radial slots, FIGS. 11a and 11b being respectively sections taken on the lines c—c and d—d of FIG. 11b.
Figure 11B:
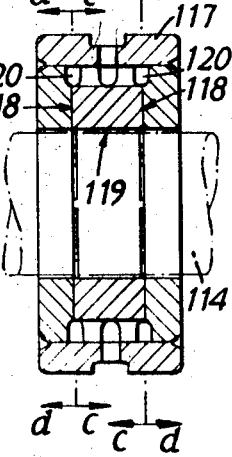
Figure 11C:
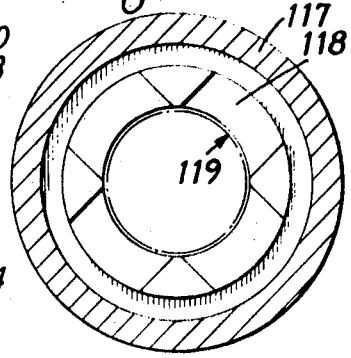

FIGS. 11a, 11b and 11c show the same arrangement as FIGS. 10a, 10b and 10c, but provided in a double row bearing and with each row of slots fed in similar manner to that described for FIGS. 9a, 9b and 9c.

Figure 13A:
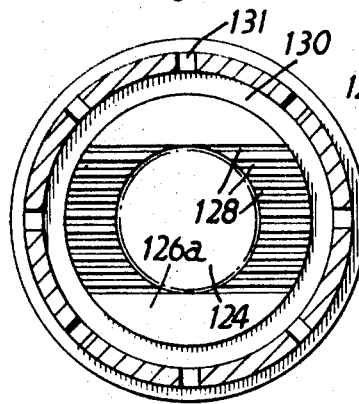
FIGS. 13a, 13b and 13c are views of a seventh embodiment of bearing in which slots are constituted by alignment of recesses on two abutting bearing elements, FIGS. 13a and 13c being respectively sections taken on the lines a—a and b—b of FIG. 13b.
Figure 13B:
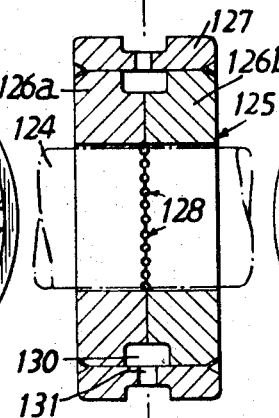
Figure 13C:
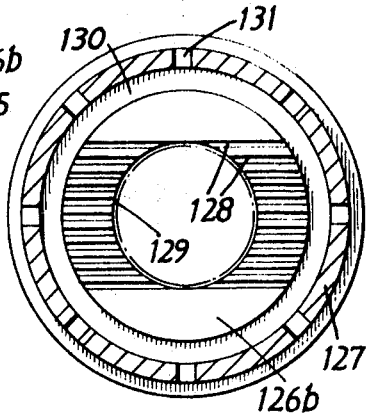

FIGS. 13a, 13b and 13c show a construction of bearing in which an inner bearing member is rotatable within an outer bearing member 125 constituted by two elements 126a and 126b enclosed within an annulus 127. On the radial inner end face of each of the elements 126a and 126b there are formed a plurality of parallel recesses 128, and these recesses are formed in corresponding positions on both of the elements, so that recesses of each element combine in pairs to form parallel feed slots. Each slot opens, at its inner end to the bearing gap 129 defined between the bearing members, and at its outer end to a feed passage 130 fed with pressure fluid through a plurality of openings 131.

Figure 14A:
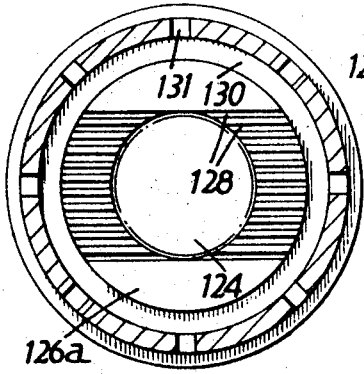
FIGS. 14a, 14b and 14c are views of an eighth embodiment of bearing in which slots are formed by disposition at right angles of recesses respectively formed on two abutting bearings elements, FIGS. 14a and 14c being respectively sections taken on the lines c—c and d—d of FIG. 14b.
Figure 14B:
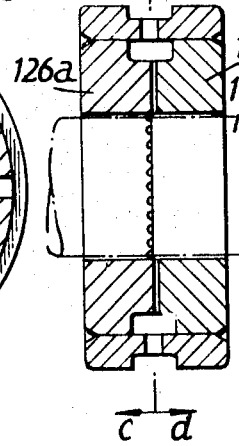
Figure 14C:
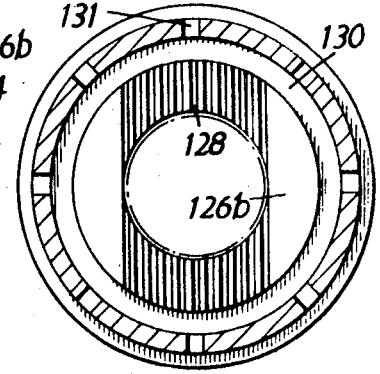

FIGS. 14a, 14b and 14c show an arrangement of bearing in which the outer bearing elements 126a and 126b are identical with those of FIGS. 13a, 13b and 13c. The recesses 128 of each element define, with the coincident land areas of the radial end face of the other element, a plurality of slots opening at their inner end to the bearing gap, and at their outer end to the feed passage.

FIGS. 15a, 15b and 15c and 15d, show a bearing in which radial slots similar to those described in relation to FIGS. 8a, 8b and 8c are used in a double row in combination with axial slots. An inner bearing member 132 in the form of a plain cylindrical shaft is disposed within an outer bearing member assembly 133 constituted by elements 134a, 134b and 134c, enclosed within a sleeve 135. Between the adjacent end faces of elements 134a and 134b there are formed slots defined by the recesses 136 and the land areas of the abutting end face, and the eight recesses in each abutting end face give a total of sixteen radial slots in each of the two rows of the bearing.

The element 134b has a peripheral channel 137 fed with pressure fluid through a plurality of openings 138, and the end wall flanges 139 have gaps 140 through which fluid is supplied from the channel 137 to annular passages 141 to feed the outer end of all of the radial slots.

The element 134b is divided into three segments by cuts made in planes forming a tangent to a cylinder coaxial with the bearing gap. These cuts are indicated at 142, in FIG. 15b. At each cut, the resulting face of one of the two abutting segments is cut back angularly, over an axial length less than that of the element 134b, so as to result in an inclined slot 143. The slots 143 open at their inner end into the bearing gap 144 defined between the bearing members, and at their outer end into the peripheral feed channel 137. The direction of slope of the slots 143 is such that they feed the bearing fluid into the bearing gap in a direction counter to the rotation of the inner bearing member 132, as indicated by the arrow in FIG. 15b.

FIGS. 16a, 16b, 16c and 16d show an arrangement of bearing which is identical to that described in relation to FIGS. 15a, 15b, 15c and 15d, with the exception that the radial feed slots 145 are formed by a first set of parallel recesses 146 on the end face of one element abutting against an end face of the adjacent element, and a second set of parallel recesses 146 on the end face of one element abutting against an end face of the adjacent element, the two sets of recesses 146 being arranged at right angles to each other in the manner described in relation to FIGS. 14a, 14b and 14c.

FIGS. 17a and 17b show a construction of bearing in which there are only axial slots and no radial slots. The bearing is composed of a plain cylindrical inner bearing member 147 disposed within an outer bearing member 148, composed of an element 149 situated within a sleeve 150. A bearing gap 151 is defined between the two bearing members. The element 149 is divided into three segments by cuts at 152, and the face of one of the abutting segments of each pair is cut back, for less than the axial length of the element, to provide a slot formation 153. The cutting back is performed by making a plurality of parallel recesses 153a separated by lands which abut against the end face of the neighbouring segment. The element 149 has a peripheral annular supply passage 154, and the slots of the formation 153 each open into the bearing gap 151 at their inner end, and into the supply passage 154 at their outer end. The supply passage receives pressure fluid through a plurality of supply openings 155.

All of the embodiments of bearing illustrated and described advantageously have at least the outer bearing elements incorporating silicon nitride.

FIG. 18 shows two graphs relating to load factor and "stiffness" of the bearing, and FIG. 19 is a graph showing the relationship between $L/D$ ratio and "stiffness" of the bearing.

I claim:

1. A fluid bearing assembly comprising first and second bearing members relatively rotatable about an axis of rotation for the bearing assembly and serving to define between them a fluid bearing gap, one of said bearing members including first and second elements and means locking said first and second elements in assembly stationarily one with respect to the other, said first element and said second element both having a respective radial face into which there is formed a plurality of parallel equi-spaced parallel-sided shallow recesses the depth dimension of which is axial and the longitudinal median line of each of which is parallel to a diameter to the said one bearing member, said plurality of recesses extending chordally as far as the gap-defining surface of said one bearing member, said first and second elements being butted one against the other and being relatively angularly positioned such that said plurality of recesses of said first element are opposed to and aligned with said plurality of recesses of said second element thereby to define a plurality of slots open at one end to the bearing gap, and wherein the respective circumferential widths of the said open end of said plurality of slots are in total more than half of the circumference of said one bearing member at its periphery defining the bearing gap, said one bearing member including passage means communicating with said plurality of slots for feeding bearing fluid to the bearing gap.

References Cited

UNITED STATES PATENTS

| | | | |
|---|---|---|---|
| 2,095,313 | 10/1937 | Carter et al. | 308—9 |
| 3,132,903 | 5/1964 | Webb | 308—122 |
| 3,256,451 | 6/1966 | Shipman | 308—9 |
| 3,368,850 | 2/1968 | Wilcox | 308—9 |
| 3,186,774 | 9/1962 | Wilcox | 308—5 |

FRED C. MATTERN, JR., Primary Examiner